United States Patent
Niu et al.

(10) Patent No.: US 11,029,879 B2
(45) Date of Patent: Jun. 8, 2021

(54) PAGE SIZE SYNCHRONIZATION AND PAGE SIZE AWARE SCHEDULING METHOD FOR NON-VOLATILE MEMORY DUAL IN-LINE MEMORY MODULE (NVDIMM) OVER MEMORY CHANNEL

(71) Applicant: Samsung Electronics Co., Ltd., Gyeonggi-do (KR)

(72) Inventors: Dimin Niu, Sunnyvale, CA (US); Mu Tien Chang, San Jose, CA (US); Hongzhong Zheng, Los Gatos, CA (US); Sun Young Lim, Gyeonggi-do (KR); Jae-Gon Lee, Gyeonggi-do (KR); Indong Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 51 days.

(21) Appl. No.: 15/949,934

(22) Filed: Apr. 10, 2018

(65) Prior Publication Data
US 2019/0235788 A1 Aug. 1, 2019

Related U.S. Application Data

(60) Provisional application No. 62/623,295, filed on Jan. 29, 2018.

(51) Int. Cl.
*G06F 3/06* (2006.01)

(52) U.S. Cl.
CPC .......... *G06F 3/0659* (2013.01); *G06F 3/0604* (2013.01); *G06F 3/0644* (2013.01); *G06F 3/0679* (2013.01)

(58) Field of Classification Search
CPC ...... G06F 3/0688; G06F 13/16; G06F 3/0656; G06F 3/0679; G06F 3/061; G06F 3/064; G06F 9/4406; G06F 3/0659; G06F 3/0604; G06F 3/0644
See application file for complete search history.

(56) References Cited

U.S. PATENT DOCUMENTS

| 6,219,765 | B1 * | 4/2001 | Jeddeloh | G06F 12/0215 711/105 |
| 9,747,229 | B1 | 8/2017 | Hayes et al. | |
| 9,763,903 | B2 * | 9/2017 | Hoffman | A61K 31/7088 |
| 9,767,903 | B2 * | 9/2017 | Cho | G11C 14/0018 |
| 2003/0159008 | A1 * | 8/2003 | Sprangle | G06F 12/0215 711/154 |
| 2004/0064649 | A1 * | 4/2004 | Volpe | G06F 12/0862 711/137 |
| 2004/0123067 | A1 * | 6/2004 | Sprangle | G06F 12/0215 711/204 |
| 2008/0181252 | A1 | 7/2008 | Rofougaran | |

(Continued)

*Primary Examiner* — Zhuo H Li
(74) *Attorney, Agent, or Firm* — The Farrell Law Firm, P.C.

(57) ABSTRACT

A method of page size aware scheduling and a non-transitory computer-readable storage medium having recorded thereon a computer program for executing the method of page size aware scheduling are provided. The method includes determining a size of a media page; determining if the media page is open or closed; performing, by a memory controller, a speculative read operation if the media page is determined to be open; and performing, by the memory controller, a regular read operation if the media page is determined to be closed.

14 Claims, 4 Drawing Sheets

(56) References Cited

U.S. PATENT DOCUMENTS

| | | | |
|---|---|---|---|
| 2011/0191487 A1* | 8/2011 | Ziems | H04L 65/1083 |
| | | | 709/231 |
| 2011/0191526 A1 | 8/2011 | Haukness et al. | |
| 2011/0252184 A1* | 10/2011 | Cho | G06F 3/0608 |
| | | | 711/102 |
| 2014/0068154 A1* | 3/2014 | Hoya | G06F 3/0629 |
| | | | 711/103 |
| 2014/0237157 A1* | 8/2014 | Takefman | G06F 11/1008 |
| | | | 711/3 |
| 2014/0240389 A1 | 8/2014 | Wu et al. | |
| 2015/0347151 A1 | 12/2015 | Takefman et al. | |
| 2016/0224419 A1 | 8/2016 | Takai et al. | |
| 2017/0040057 A1 | 2/2017 | Cho et al. | |
| 2017/0102873 A1 | 4/2017 | Hanson et al. | |
| 2017/0186478 A1 | 6/2017 | Shaeffer et al. | |
| 2018/0060257 A1* | 3/2018 | Nygren | G06F 13/1673 |
| 2018/0188988 A1* | 7/2018 | Jain | G11C 7/1045 |
| 2018/0188994 A1* | 7/2018 | Srikanth | G06F 3/0656 |

* cited by examiner

| MR1 | 201 | |
|---|---|---|
| ADDRESS | OPERATING MODE | DESCRIPTION |
| BG1 | RFU | • • • |
| BG0, BA1, BA0 | MR SELECT | • • • |
| A17 | RFU | • • • |
| A13 | RFU | • • • |
| A12 | Qoff | • • • |
| A11 | TDSQ enable | • • • |
| A10, A9, A8 | RTT_NOM | • • • |
| A7 | Write Leveling Enable | • • • |
| A6, A5 | RFU | • • • |
| A4, A3 | Additive Latency | • • • |
| A2, A1 | Output Driver Impedance Control | • • • |
| A0 | DLL Enable | • • • |

PAGE SIZE SYNCHRONIZATION AND PAGE SIZE AWARE SCHEDULING METHOD FOR NON-VOLATILE MEMORY DUAL IN-LINE MEMORY MODULE (NVDIMM) OVER MEMORY CHANNEL

PRIORITY

This application claims priority under 35 U.S.C. § 119(e) to a U.S. Provisional patent application filed on Jan. 29, 2018 in the United States Patent and Trademark Office and assigned Ser. No. 62/623,295, the entire contents of which are incorporated herein by reference.

FIELD

The present disclosure relates generally to a method and an apparatus for determining a media page size and memory scheduling, and more particularly, to a method and apparatus for determining media page size for a non-volatile dual in-line memory module (NVDIMM) and NVDIMM scheduling.

BACKGROUND

Trends for a next-generation memory interface include a transaction-based interface for non-volatile memory (NVM) as main memory, variable read/write timing, and feedback information from a dual in-line memory module (DIMM). For example, NVDIMM-P, which is a standard of the Joint Electron Device Engineering Council (JEDEC) Solid State Technology Association, hybrid memory cube (HMC), Hewlett-Packard (HP) memory, and GenZ Consortium memory may be required.

In future memory systems, NVMs (e.g., NVDIMMs) and dynamic random access memory (DRAM) (e.g., DIMMs) may co-exist on the same, transaction-based memory channel as tired memory (e.g., within the same rank or channel, in a different channel, etc.).

However, double data rate (DDR) random access memory (RAM) (e.g., fourth generation DDR (DDR4)) has a fixed page size based on row and address limitations. NVDIMM-P does not have such a limitation, but instead, relies on the size of the entire underlying media pages. For example, a DDR may have a fixed number of column addresses such as a 512 byte page size for a x4 device, a 1 Kbyte page size for a x8 device, and a 2 Kbyte page size for a x16 device.

In an NVDIMM-P, there is no concept of row and column addresses. Thus, a host cannot take advantage of spatial locality of data.

New protocols support different types of media (e.g., backend media). However, a host and a memory controller do not have a way of knowing the real page size of the media. Thus, a host and a memory controller may not be able to benefit from knowing the media page size to perform page aware scheduling, best bus utilization, etc.

Thus, there is a need for a mechanism to allow an NVDIMM to share a size of a media page with a host memory controller.

SUMMARY

According to one embodiment, a method of page size aware scheduling is provided. The method includes determining a size of a media page; determining if the media page is open or closed; performing, by a memory controller, a speculative read operation if the media page is determined to be open; and performing, by the memory controller, a regular read operation if the media page is determined to be closed.

According to an embodiment, a non-transitory computer-readable recording medium having recorded thereon a computer program for executing a method of page size aware scheduling is provided. The method includes determining a size of a media page; determining if the media page is open or closed; performing, by a memory controller, a speculative read operation if the media page is determined to be open; and performing, by the memory controller, a regular read operation if the media page is determined to be closed.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figures 1, 2:
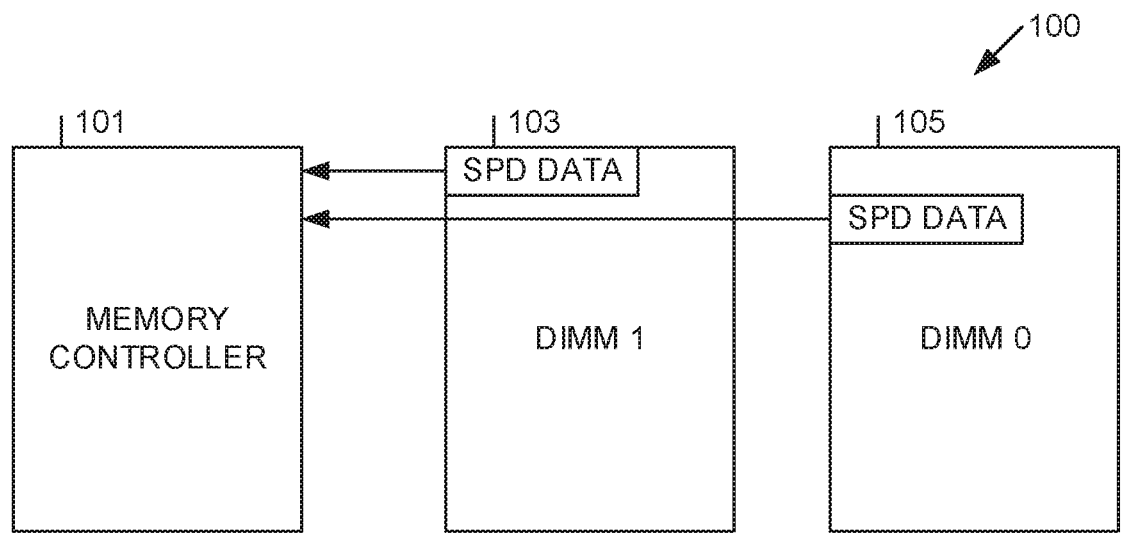
FIG. 1 is a block diagram illustrating a page size stored in a DIMM, according to one embodiment.
FIG. 2 is an illustration of a media page size stored in a mode register, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The present disclosure concerns a mechanism by which a memory controller may determine an underlying media page size of a memory (e.g., an NVDIMM-P memory), and using the media page size to improve scheduling of memory.

A page size synchronization mechanism for an NVM (e.g., an NVDIMM) over a memory channel includes a memory controller that identifies a page size of backend media of an NVM (e.g., an NVDIMM) by one of three methods described below.

The first method includes identifying a media page size during system bootup through a serial presence detect (SPD) readout of a memory. The second method includes identifying a media page size through a mode register read command, and the third method includes identifying a media page size by a message packet exchange.

A memory controller may take advantage of knowing a size of a media page during memory scheduling to conduct page size aware memory scheduling and to better utilize a bus to improve system performance.

FIG. 1 is a block diagram illustrating a media page size stored in a DIMM, according to one embodiment.

Referring to FIG. 1, a host 100 includes a memory controller 101, a first DIMM (e.g., DIMM 0) 105, and a second DIMM (e.g., DIMM 1) 103. A media page size is stored as SPD data in the first DIMM 105 and the second DIMM 103. The memory controller 101 is connected to the first DIMM 105 and the second DIMM 103.

The first method of the present disclosure is for the memory controller 101 to read a media page size via SPD readout during system bootup, where the SPD data includes the media page size. A memory controller may read a media page size from an NVDIMM electrically-erasable programmable memory (EEPROM) over a system management bus (SMBus) at boot time. For example, the memory controller 101 may read the media pages sizes of the first DIMM 105 and the second DIMM 103 during system bootup by reading the SPD data stored in the first DIMM 105 and the second DIMM 103, respectively.

FIG. 2 is an illustration of a media page size stored in a mode register, according to one embodiment.

Referring to FIG. 2, a mode register may be a mode register from JEDEC Standard JESD79-4 for DDR4 static dynamic random access memory (SDRAM).

The second method of the present disclosure is to store the size of a media page size in a mode register (e.g. mode register 1 (MR1)). A media page size may be stored in a mode register at any of the addresses reserved for future use (RFU) (e.g., addresses BG1, A17, A13, A5, and A6). Coding may be used to take into account the limited number of bits available in the mode register. A memory controller may then determine the media page size using a mode register set (MRS) command to read the media page size stored in the mode register.

Figure 3:
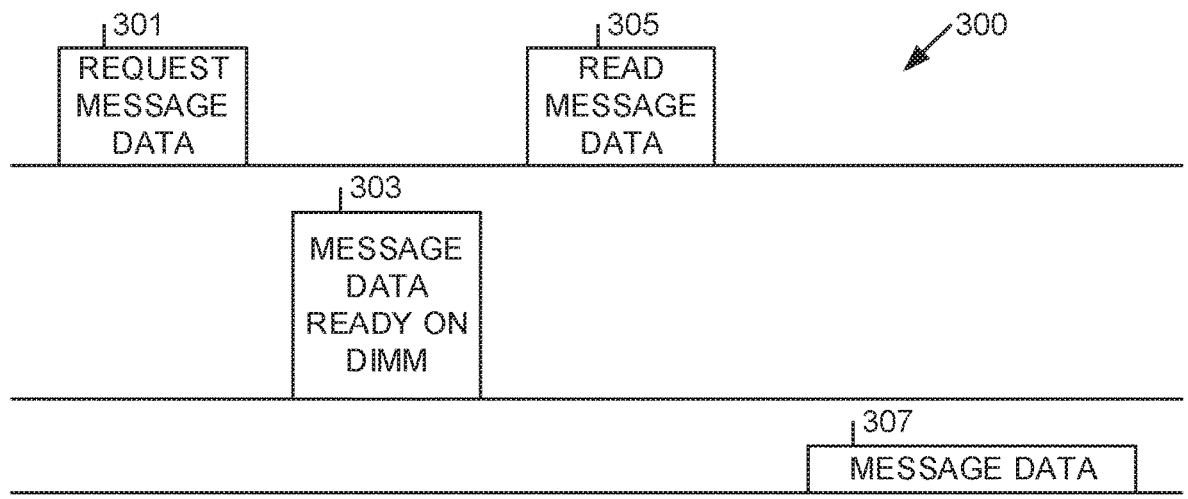
FIG. 3 is an illustration of a media page size stored in message data, according to one embodiment.

FIG. 3 is an illustration of a media page size stored in message data, according to one embodiment.

Referring to FIG. 3, a regular READ operation (e.g., a regular read operation, as XREAD operation, etc.) for a memory controller is illustrated that includes the memory controller transmitting a request message data signal 301 (e.g., a regular read signal) to a memory, the memory controller receiving a message data ready on DIMM signal (e.g., a READY signal) from the memory, the memory controller transmitting read message data signal 305 (e.g., a SEND signal) to the memory, and the memory controller receiving MESSAGE DATA 307 from the memory, where the MESSAGE DATA 307 includes the page size of the memory.

The third method of the present disclosure is to include a media page size field in a message packet (e.g., an NVDIMM-P message packet). A memory controller then reads the media size from the message packet.

Figure 4:
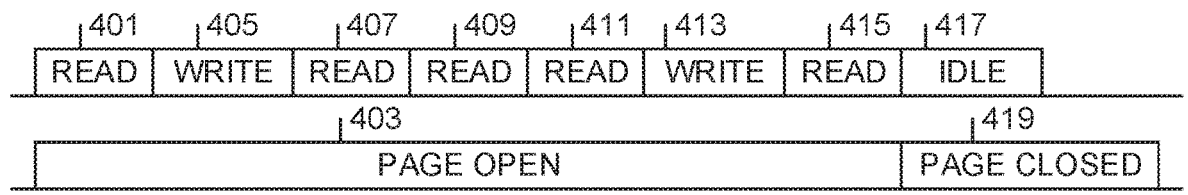
FIGS. 4 and 5 are illustrations of page size aware scheduling, according to one embodiment.
Figure 5:
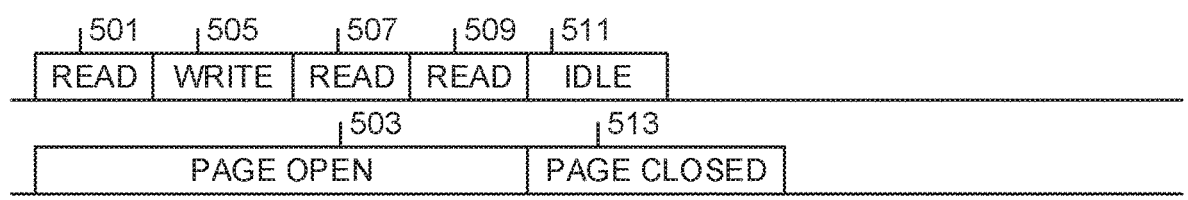

FIGS. 4 and 5 are illustrations of page size aware scheduling, according to one embodiment.

Referring to FIGS. 4 and 5, the present disclosure provides a page size aware scheduling operation. A memory controller first determines a page size of media using one of the three methods described above. The memory controller then tracks whether a media page (rather than just DRAM pages) is open or closed. Knowing that a media page is open or closed, the memory controller may then better utilize channel bandwidth.

For example, a memory controller may use media page size to track the open and closed status of the media page based on a number of transactions and/or the passage of time since the last transaction.

For example, in an embodiment a media page may be determined to be open within a time frame from the last activity of the media page, and the media page may be determined to be closed when the media page is idle for a period of time.

FIGS. 4 and 5 illustrate that a media page is determined to be open while read operations and write operation are being conducted concerning the media page, and the media page is determined to be closed after a time for which there is no read operation or write operation (e.g., an idle time) concerning the media page.

There are two possible read options in NVDIMM-P, a regular read operation, and a speculative read operation (e.g., an SREAD operation).

The regular read operation requires handshake communication, uses non-deterministic timing, has low bus utilization, and has high read latency.

The speculative read operation uses deterministic timing for a first response, waits for a read ready response if data is invalid (e.g., a miss occurs), has high bus utilization, and has either high or low read latency.

A memory controller may or may not perfectly track a page open/close status. If a memory controller is aware of the page management inside an NVDIMM, the memory controller can perfectly track the open/close status. However, information on the internal DIMM organization/mechanisms may not be obtainable. If the memory controller does not know the page management inside an NVDIMM, the memory controller may predict the page open/close status by using information such as access patterns, access timing information, etc. That is, the memory controller may perform page size aware scheduling by tracking whether a media page is open or closed and use the open or closed status of the media page for scheduling to achieve better bus utilization and better system performance. For example, a memory controller may transmit a speculative read signal for data in an open media page and transmit a regular read signal for data in a closed media page. Speculative read and regular read operations are part of the NVDIMM-P standards, but their usage is not aligned with memory page size and open/close status. In an embodiment, a media page is determined to be open within a time frame from a last activity of the media page. In an embodiment, a media page is determined to be closed when the media page is idle for a period of time. The page open/close status is mistracked, but it will not impact the correctness of the data on the host. This is only a performance penalty. However, the overall performance is still better than only using one read operation at a time.

Figure 6:
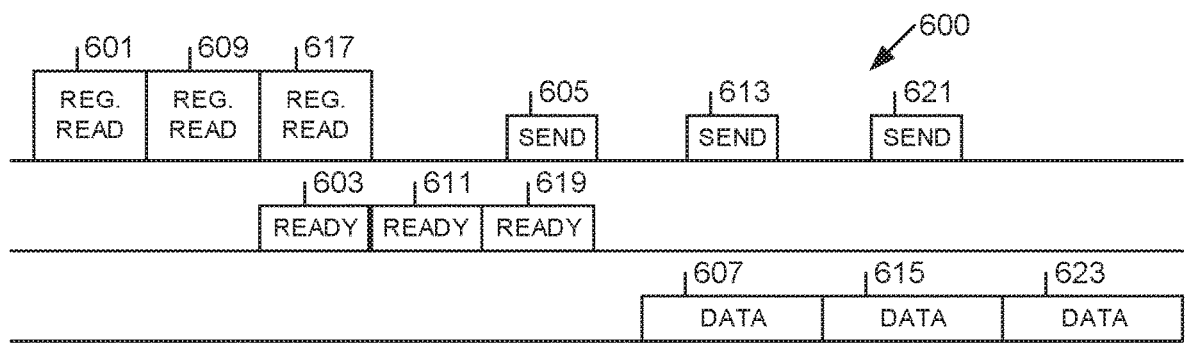
FIG. 6 is an illustration of a regular read operation, according to one embodiment.

FIG. 6 is an illustration of a regular read operation, according to one embodiment.

Referring to FIG. 6, a first regular read signal 601 is transmitted by a memory controller to a memory. A first READY signal 603 associated with the first regular read signal 601 is received by the memory controller from the memory. The memory controller then transmits a first SEND signal 605 associated with the first READY signal 603 to the memory, and the memory controller receives first DATA 607 associated with the first SEND signal 605 from the memory.

A second regular read signal 609 is transmitted by the memory controller to the memory. A second READY signal 611 associated with the second regular read signal 609 is received by the memory controller from the memory. The memory controller then transmits a second SEND signal 613 associated with the second READY signal 611 to the memory, and the memory controller receives second DATA 615 associated with the second SEND signal 613 from the memory.

A third regular read signal 617 is transmitted by the memory controller to the memory. A third READY signal 619 associated with the third regular read signal 617 is received by the memory controller from the memory. The memory controller then transmits a third SEND signal 621 associated with the third READY signal 619 to the memory, and the memory controller receives third DATA 623 associated with the third SEND signal 621 from the memory.

Figure 7:
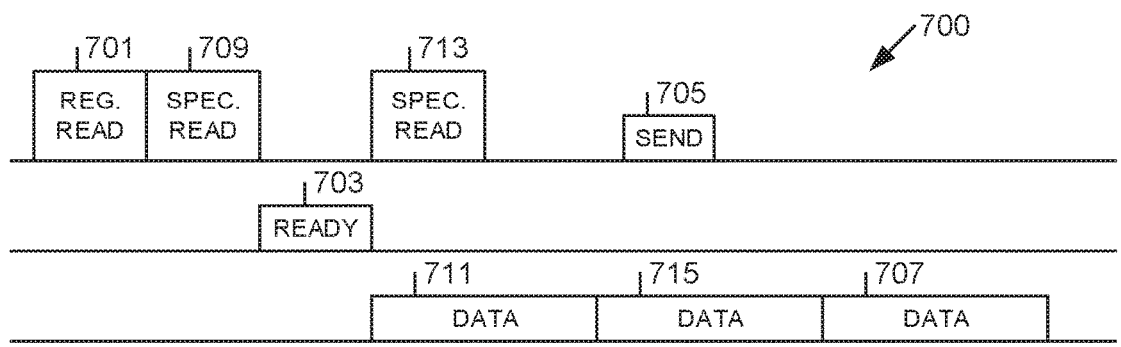
FIG. 7 is an illustration of a regular read operation and a speculative read operation, according to one embodiment.

FIG. 7 is an illustration of a regular read operation and a speculative read operation, according to one embodiment.

Referring to FIG. 7, a regular read signal 701 is transmitted by a memory controller to a memory. A READY signal 703 associated with the regular read signal 701 is received by the memory controller from the memory. The memory controller then transmits a SEND signal 705 associated with the READY signal 703 to the memory, and the memory controller receives first DATA 707 associated with the SEND signal 705 from the memory.

A first speculative read signal 709 is transmitted by the memory controller to the memory. Since the media page is determined to be open, the memory controller receives second DATA 711 from the memory without having to receive a READY signal from the memory or having to send a SEND signal to the memory after receiving a READY signal from the memory. Thus, bus utilization and system performance are increased.

A second speculative read signal 713 is transmitted by the memory controller to the memory. Since the media page is determined to be open, the memory controller receives third DATA 715 from the memory without having to receive a READY signal from the memory or having to send a SEND signal to the memory after receiving a READY signal from the memory. Thus, bus utilization and system performance are increased.

Figure 8:
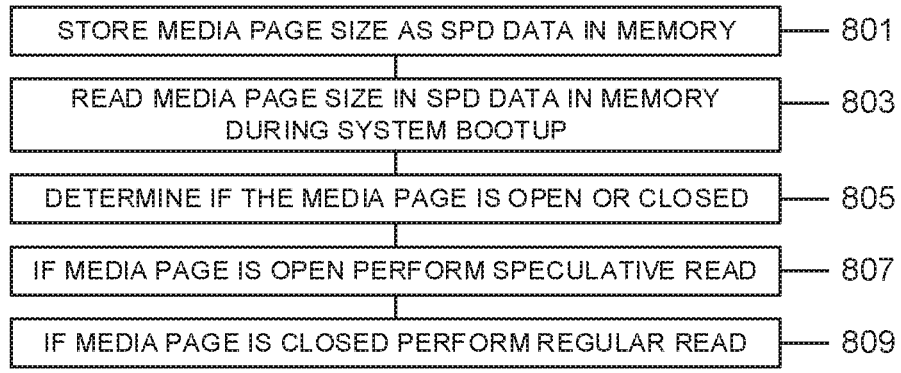
FIG. 8 is a flowchart of a method of page size aware scheduling, according to one embodiment.

FIG. 8 is a flowchart of a method of page size aware scheduling, according to one embodiment.

Referring to FIG. 8, at 801, a size of a media page is stored as SPD data in a memory.

At 803, the media page size is read by a memory controller from the SPD data stored in the memory during system bootup.

At 805, it is determined if the media page is open or closed.

At 807, a speculative read operation is performed if the media page is determined to be open.

At 809, a regular read operation is performed if the media page is determined to be closed.

In an embodiment, the method of FIG. 8 may be implemented in a non-transitory computer-readable medium.

Figure 9:
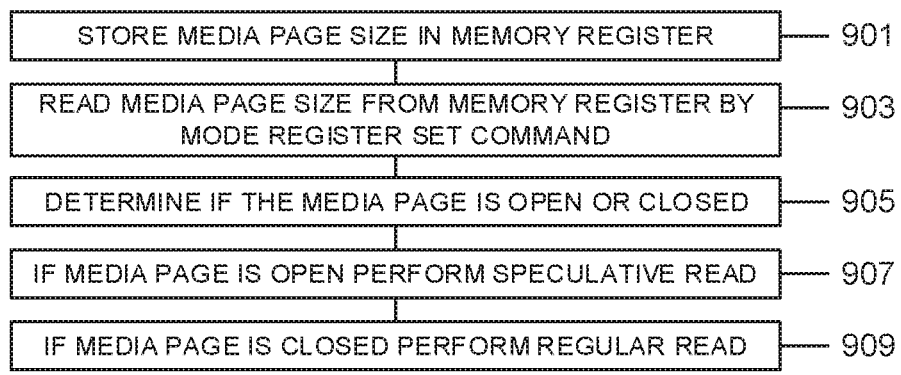
FIG. 9 is a flowchart of a method of page size aware scheduling, according to one embodiment.

FIG. 9 is a flowchart of a method of page size aware scheduling, according to one embodiment.

Referring to FIG. 9, at 901, a size of a media page is stored in a memory register.

At 903, the media page size is read by a memory controller from the memory register using a mode register set command.

At 905, it is determined if the media page is open or closed.

At 907, a speculative read operation is performed if the media page is determined to be open.

At 909, a regular read operation is performed if the media page is determined to be closed.

In an embodiment, the method of FIG. 9 may be implemented in a non-transitory computer-readable medium.

Figure 10:
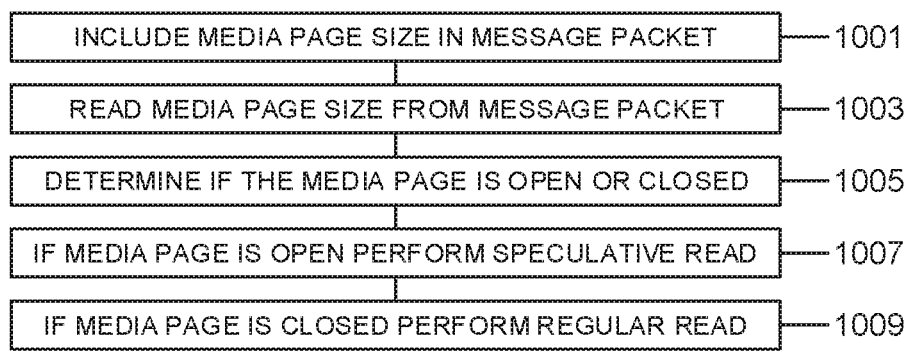
FIG. 10 is a flowchart of a method of page size aware scheduling, according to one embodiment.

FIG. 10 is a flowchart of a method of page size aware scheduling, according to one embodiment.

Referring to FIG. 10, at 1001, a size of a media page is included in a message packet.

At 1003, the media page size is read by a memory controller from the message packet.

At 1005, it is determined if the media page is open or closed.

At 1007, a speculative read operation is performed if the media page is determined to be open.

At 1009, a regular read operation is performed if the media page is determined to be closed.

In an embodiment, the method of FIG. 10 may be implemented in a non-transitory computer-readable medium.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of page size aware scheduling in a memory device, comprising:
   determining a size of a media page, wherein the size of the media page is less than a size of the memory device;
   storing the media page size in a mode register in an address reserved for future use in the mode register;
   performing, by a memory controller, a speculative read operation on the media page within a predetermined time frame from a last activity on the media page; and
   performing, by the memory controller, a non-speculative read operation on the media page when the media page is idle for a predetermined threshold period of time,
   wherein the last activity on the media page and an idle time of the media page are determined from the media page size.

2. The method of claim 1, wherein determining the media page size is comprised of:
   storing the media page size in serial presence detect (SPD) data in the memory device; and
   reading, by the memory controller, the media page size from the SPD data stored in the memory device within a predetermined time interval of a system bootup.

3. The method of claim 2, wherein reading the media page is comprised of reading, by the memory controller, the media page over a system management bus (SMBus).

4. The method of claim 1, wherein determining the media page size is comprised of:
   reading, by the memory controller, the media page size from the mode register.

5. The method of claim 4, wherein reading the media page size from the mode register is comprised of reading the media page size from the mode register using a mode register set command.

6. The method of claim 1, wherein determining the media page size is comprised of:
   including, by the memory device, the media page size in a message packet; and
   reading, by the memory controller, the media page size from the message packet.

7. The method of claim 1, wherein the memory device is a non-volatile memory (NVM), wherein the NVM is one of a non-volatile dual in-line memory module (NVDIMM), an NVDIMM of an NVDIMM-P standard of the Joint Electron Device Engineering Council (JEDEC) Solid State Technology Association, a hybrid memory cube (HMC), a Hewlett-Packard (HP) memory, a GenZ Consortium memory, and an NVDIMM electrically-erasable programmable read only memory (NVDIMM EEPROM).

8. A non-transitory computer-readable recording medium having recorded thereon a computer program for executing a method of page size aware scheduling in a memory device, the method comprising:
   determining a size of a media page, wherein the size of the media page is less than a size of the memory device;
   storing the media page size in a mode register in an address reserved for future use in the mode register;
   performing, by a memory controller, a speculative read operation on the media page within a predetermined time frame from a last activity on the media page; and
   performing, by the memory controller, a non-speculative read operation on the media page when the media page is idle for a predetermined threshold period of time,
   wherein the last activity on the media page and an idle time of the media page are determined from the media page size.

9. The non-transitory computer-readable recording medium of claim 8, wherein determining the media page size is comprised of:
   storing the media page size in serial presence detect (SPD) data in the memory device; and
   reading, by the memory controller, the media page size from the SPD data stored in the memory device within a predetermined time interval of a system bootup.

10. The non-transitory computer-readable recording medium of claim 9, wherein reading the media page is comprised of reading, by the memory controller, the media page over a system management bus (SMBus).

11. The non-transitory computer-readable recording medium of claim 8, wherein determining the media page size is comprised of:
    reading, by the memory controller, the media page size from the mode register.

12. The non-transitory computer-readable recording medium of claim 11, wherein reading the media page size from the mode register is comprised of reading the media page size from the mode register using a mode register set command.

13. The non-transitory computer-readable recording medium of claim 8, wherein determining the media page size is comprised of:
    including, by the memory device, the media page size in a message packet; and
    reading, by the memory controller, the media page size from the message packet.

14. The non-transitory computer-readable recording medium of claim 8, wherein the memory device is a non-volatile memory (NVM), wherein the NVM is one of a non-volatile dual in-line memory module (NVDIMM), an NVDIMM of an NVDIMM-P standard of the Joint Electron Device Engineering Council (JEDEC) Solid State Technology Association, a hybrid memory cube (HMC), a Hewlett-Packard (HP) memory, a GenZ Consortium memory, and an NVDIMM electrically-erasable programmable read only memory (NVDIMM EEPROM).

* * * * *